United States Patent
Holbus

(10) Patent No.: US 7,197,786 B2
(45) Date of Patent: Apr. 3, 2007

(54) AUTOMATIC VEHICLE WASHING APPARATUS WASH BRUSH

(76) Inventor: Edward Holbus, 1822 South St., Racine, WI (US) 53404

( * ) Notice: Subject to any disclaimer, the term of this patent is extended or adjusted under 35 U.S.C. 154(b) by 158 days.

(21) Appl. No.: 10/963,226

(22) Filed: Oct. 12, 2004

(65) Prior Publication Data

US 2006/0075590 A1    Apr. 13, 2006

(51) Int. Cl.
B60S 3/06 (2006.01)
(52) U.S. Cl. .......................... 15/230; 15/53.2; 15/97.3; 15/179
(58) Field of Classification Search ................ 15/53.2, 15/97.3, 179, 213, 230, 230.12–230.19
See application file for complete search history.

(56) References Cited

U.S. PATENT DOCUMENTS

| | | | | |
|---|---|---|---|---|
| 186,205 A | * | 1/1877 | Graves | 15/230.19 |
| 689,590 A | * | 12/1901 | Johnson et al. | 492/4 |
| 1,901,826 A | * | 3/1933 | Siebert et al. | 15/103 |
| 1,914,832 A | * | 6/1933 | Mellwig | 15/230.13 |
| 2,215,692 A | * | 9/1940 | Fleming | 451/194 |
| 3,177,511 A | * | 4/1965 | Wood | 15/97.1 |
| 3,650,281 A | | 3/1972 | Hurst | |
| 3,747,286 A | * | 7/1973 | Haigh | 451/521 |
| 4,536,911 A | * | 8/1985 | Demetriades | 15/230.12 |
| 4,852,199 A | | 8/1989 | Holbus | |
| 5,249,325 A | | 10/1993 | Wilen | |
| 5,375,289 A | | 12/1994 | Miyaoka | |
| 5,413,128 A | | 5/1995 | Butts | |
| 5,482,756 A | * | 1/1996 | Berger et al. | 428/36.2 |
| 6,067,685 A | | 5/2000 | Holbus | |
| 6,131,233 A | | 10/2000 | Bolton | |
| 6,571,423 B1 | | 6/2003 | Lijzenga | |

* cited by examiner

Primary Examiner—Mark Spisich
(74) Attorney, Agent, or Firm—Quarles & Brady LLP

(57) ABSTRACT

An automatic vehicle washing apparatus wash brush includes a cover encircling a rotatable shaft. Spokes extending radially from the shaft fix the cover relative to the shaft. Upon rotation of the shaft, centrifugal forces urge the cover radially outwardly away from the shaft toward a vehicle being washed.

20 Claims, 2 Drawing Sheets

AUTOMATIC VEHICLE WASHING APPARATUS WASH BRUSH

CROSS REFERENCES TO RELATED APPLICATIONS

Not Applicable.

STATEMENT REGARDING FEDERALLY SPONSORED RESEARCH

Not Applicable.

FIELD OF INVENTION

This invention relates to an automatic vehicle washing apparatus, and particularly to a wash brush suitable for use in an apparatus for automatically washing the exterior of an automobile or other similar vehicles.

BACKGROUND OF INVENTION

Automatic vehicle washing apparatus are well known. The apparatus typically takes one of two generic forms. In one form, an automobile is moved by a conveyor through successive stations at which various washing operations take place, such as wetting, scrubbing and rinsing. The second approach is to automatically perform these same operations upon a stationary vehicle. The present invention is adaptable to both forms of washing apparatus.

Brushes in known automatic vehicle washing apparatus include elongated wash strips formed of a flexible fabric material, such as cotton, synthetic resin, and the like, having one end fixed to a rotating shaft. The shaft is rotated to impinge the opposing end of the wash strips against the vehicle. As the wash strip engages the vehicle, dirt and grime are scrubbed off of the vehicle exterior surface. Unfortunately, as the shaft is rotated, the end of each wash strip slaps against the vehicle which can create a loud noise and be disconcerting to the vehicle occupants. Moreover, as the wash strip is slapped against the vehicle being washed, the end of the wash strip can wrap around parts of the vehicle, such as an antenna, and rip the vehicle part off of the vehicle.

One solution to this problem is a "touchless" vehicle wash apparatus that does not use brushes that contact the vehicle being washed. In a "touchless" vehicle wash apparatus, high pressure liquid, such as water, is sprayed onto the vehicle to remove dirt and grime. By not using brushes, nothing can wrap around a vehicle part and tear the part from the vehicle. Unfortunately, a "touchless" vehicle wash apparatus does not remove dirt and grime as effectively as a vehicle wash apparatus incorporating brushes. Moreover, the high pressure liquid directed at the vehicle is also noisy which is disconcerting to the vehicle occupants. Therefore, a need exists for a wash brush suitable for use in an automatic vehicle washing apparatus that does not slap against the vehicle or wrap around vehicle parts.

SUMMARY OF THE INVENTION

The present invention provides an automatic vehicle washing apparatus wash brush including a cover encircling a rotatable shaft. In one embodiment, spokes extending radially from the shaft fix the cover relative to the shaft. Upon rotation of the shaft, centrifugal forces urge the cover radially outwardly away from the shaft toward a vehicle being washed.

A general objective of the present invention is to provide an automatic vehicle washing apparatus wash strip which cleans a vehicle without slapping the vehicle or causing damage to the vehicle. This objective is accomplished in by providing an automatic vehicle washing apparatus wash brush having a cover that encircles the shaft. The cover does not have wash strip ends that can slap or damage the vehicle being washed.

The foregoing and other objects and advantages of the invention will appear from the following detailed description. In the description, reference is made to the accompanying drawings which illustrate a preferred embodiment of the invention.

DETAILED DESCRIPTION OF THE PREFERRED EMBODIMENT

Figure 1:
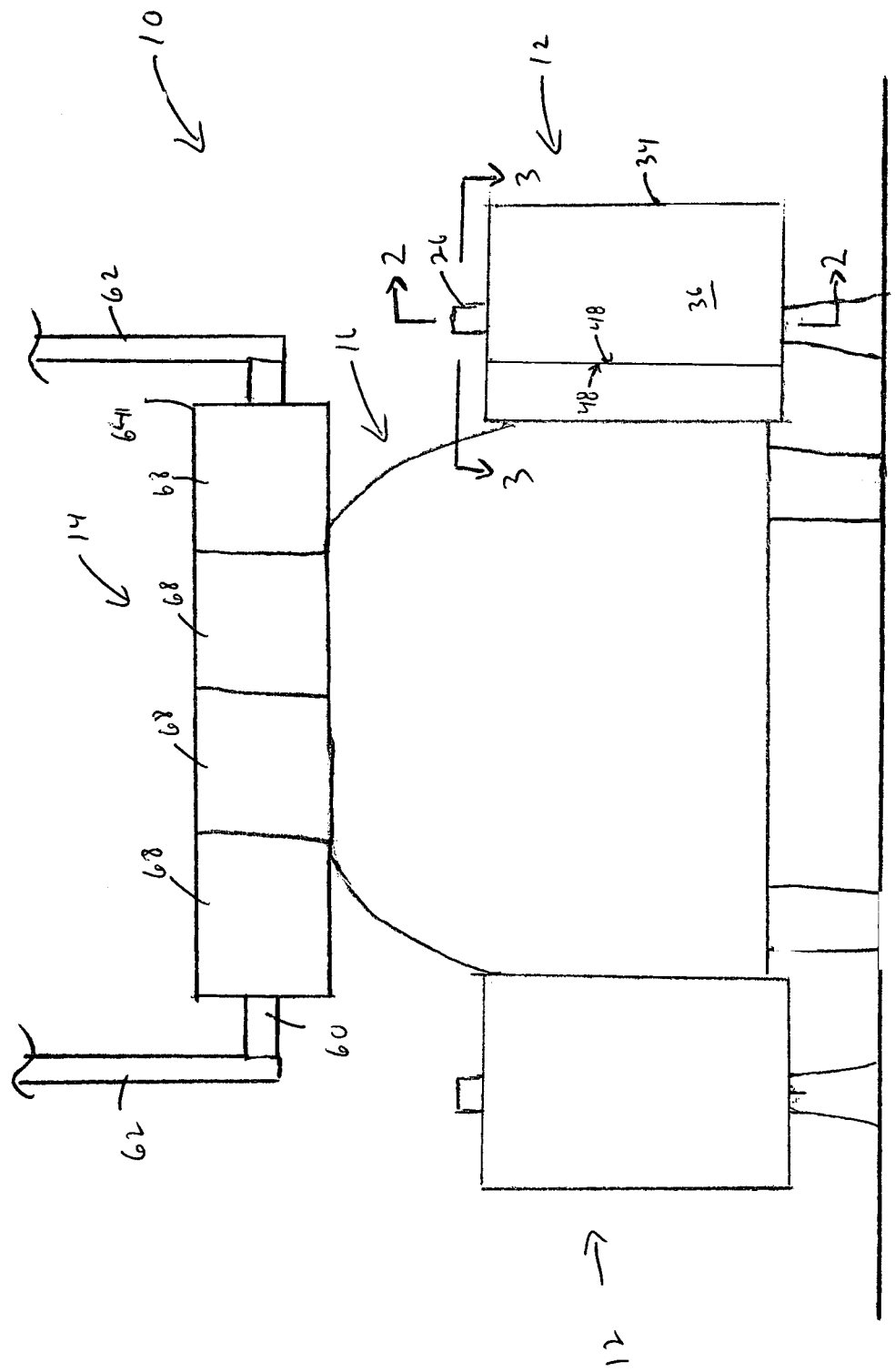
FIG. 1 is an end view of a vehicle wash apparatus in accordance with the present invention.

Referring to FIG. 1, an automatic vehicle washing apparatus 10 includes wash brushes 12, 14 that scrub a vehicle 16, such as a car, truck, and the like, moving past each brush 12, 14 along a vehicle path. Water is sprayed onto the vehicle 16, and in cooperation with the brushes 12, 14, dislodges and rinses away dirt and grime on the vehicle 16. In FIG. 1, two rotating side brushes 12 and a single rotating top brush 14 are shown. However, any number and combination of brushes having a rotating, reciprocating, or static action can be used without departing from the scope of the present invention. Moreover, the vehicle 16 can be stationary and the brushes 12, 14 can be moved relative to the vehicle 16 without departing from the scope of the invention.

Figure 2:
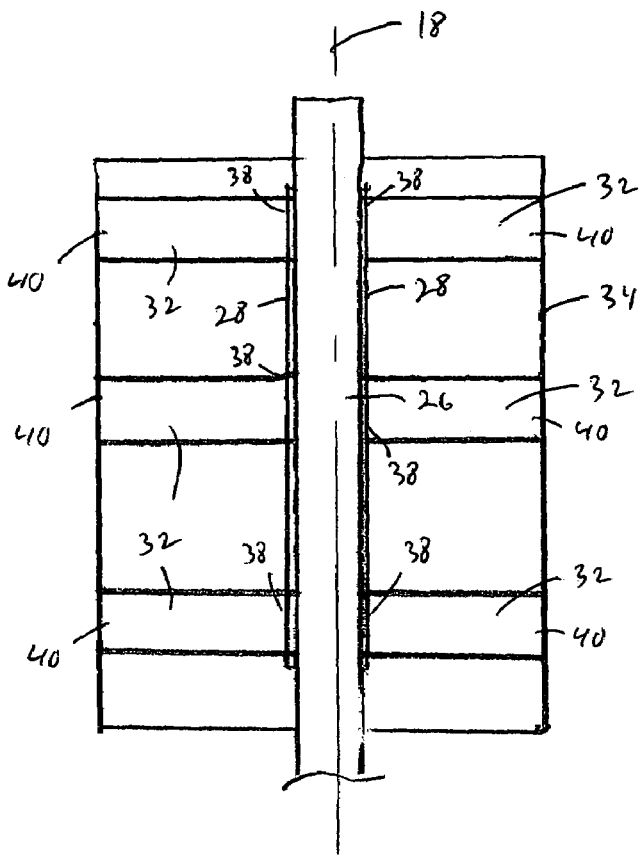
FIG. 2 is a cross sectional view along line 2—2 of FIG. 1.
Figure 3:
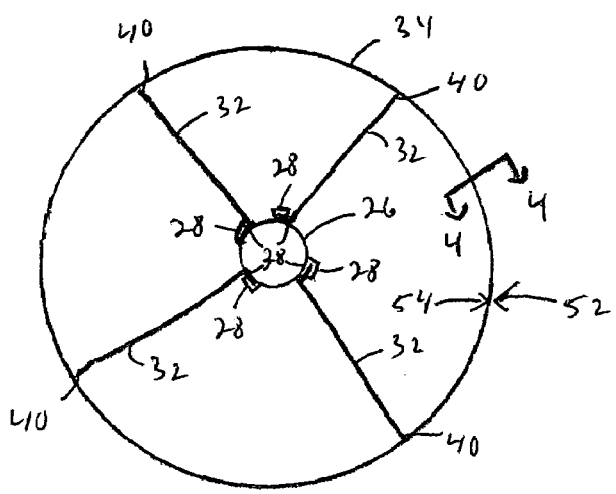
FIG. 3 is a cross sectional view along line 3—3 of FIG. 1.
Figure 4:
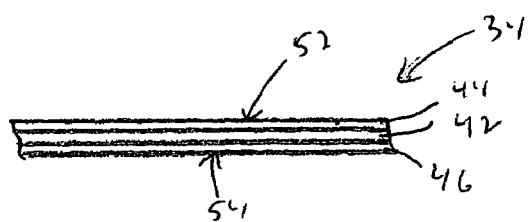
FIG. 4 is a cross sectional view along line 4—4 of FIG. 3.

The side brushes 12 are substantially identical. Accordingly, only one of the side brushes 12 will be described with the understanding that the description applies to the other side brush 12. As shown in FIGS. 2-4, the side brush 12 includes a vertically extending rotating shaft 26 mounted adjacent to the vehicle path. The shaft 26 can be rotated about a vertical axis 18 using any methods known in the art, such as belt driven, chain driven, gear driven, direct drive, and the like. Clamp bars 28 substantially parallel to the shaft axis 18 are detachably fixed to the shaft 26 using methods known in the art, such as bolts, screws, straps, and the like. The clamp bars 28 secure spokes 32 to the shaft 26.

The spokes 32 extend radially from the shaft 26 and radially support a flexible cylindrical cover 34 that engages the vehicle 16 to remove dirt and grime from the vehicle 16. Each spoke 32 includes a proximal end 38 and a distal end 40, and is fixed to the shaft 26 by securing the proximal end 38 between one of the clamp bars 28 and the shaft 26. Of course, other methods for securing the spoke 32 to the shaft can be used, such as bolts, screws, hooks, straps, and the like without departing from the scope of the invention. Preferably, the distal end 40 of each spoke 32 is fixed to the cover 34 using methods known in the art, such as sewing, ultrasonic welding, snaps, hooks, buttons, hook and loop fasteners, and the like, to fix the cover 34 relative to the shaft 26. In an alternative embodiment, both ends 38, 40 of each spoke 32 are secured to the shaft 26, and the cover 34 is fixed to the spoke 32 anywhere along the length of the spoke 32.

In one embodiment, each spoke 32 is formed from a non-stretching flexible material, such as a polyester vinyl material, However, the spokes 32 can be formed from any material that can radially support the cover 34, such as a composite material, rubber, cotton, foam, and the like. Moreover, the spokes 32 can be formed from a non-flexible material, such as a metallic frame fixed to portions of the cover 34 that do not contact the vehicle 16 being washed, such as a top and bottom end of the cover 34, without departing from the scope of the material.

Referring to FIGS. 1–3, the cover 34 encircles the shaft 26 and is radially supported by the spokes 32. The shaft 26 rotatably drives the cover 34 to centrifugally force the cover 34 radially outwardly against the vehicle 16 being washed. In one embodiment, the cover 34 is formed from a four sided strip of material 36 having two opposing sides 48 joined together using methods known in the art, such as sewing, ultrasonic welding, snaps, hooks, buttons, hook and loop fasteners, and the like, to form an endless strip. Advantageously, by forming a cover 34 which is an endless strip, there are no strip ends that can slap the vehicle 16 or wrap around vehicle parts. In certain embodiments, a substantially cylindrical cover 34 substantially coaxial with the shaft axis 18 may be preferred. However, a cover 34 that is not substantially cylindrical or has a longitudinal axis offset from the shaft axis and/or not parallel to the shaft axis can be used without departing from the scope of the invention.

The cover 34 can be formed from any flexible material known in the art for washing a vehicle, such a microfiber fabric, cotton, foam, nylon, polyester, and the like. In a preferred embodiment shown in FIG. 4, the cover 34 is a composite material including a core 42 sandwiched between an outer material 44 and an inner material 46. Although a cover 34 formed from three layers of material is disclosed, the cover 34 can include one or more layers without departing from the scope of the invention.

The core 42 is preferably formed from a nonstretching material, such as a polyester vinyl that stiffens the cover 34. Although a core 42 formed from a vinyl coated polyester is preferred, other flexible material, such as leather which is another nonstretching material, cotton which can stretch, and the like, can be used without departing from the scope of the invention. Moreover, the core 42 can include a sponge, or be formed solely from a sponge, that retains liquids used to wash the vehicle 16 to more evenly distribute the liquid on the vehicle 16 being washed.

The outer material 44 forms the radially outer side 52 of the cover 34, and is formed from a microfiber fabric including multi-filament fibers having a diameter of less than 1.0 denier per filament to provide a nonabrasive fabric which does not damage a vehicle finish. Preferably, the microfiber fabric contains between approximately 70% and 80% polyester and between approximately 20% and 30% polyamide which resists stretching and is nonabrasive, such as available from Edge Tech Industries, San Diego, Calif. Most preferably, the microfiber fabric is woven using a waffle weave which inhibits the cover 34 from stretching during using. Of course, the outer side 52 of the cover 34 can be formed using other materials, such as cotton without departing from the scope of the invention.

The inner material 46 forms the radially inner side 54 of the cover 34 and prolongs the life of the cover 34. Preferably, the inner material 46 is a polyfilter cloth, such as poly pro filter cloth 7001-3 available from Astrup Company of Cleveland, Ohio. Of course, a separate inner material 46 forming the radially inner side 54 of the cover 34 can be omitted and the radially inner side 54 can be formed from the core 42 or material forming the radially outer side 52 of the cover 34 without departing from the scope of the invention.

Referring back to FIG. 1, the top brush 14 includes a horizontally extending rotatable shaft 60 mounted above the vehicle path by support structure 62. As in the side brush shaft 26, the horizontal shaft 60 can be rotated using any methods known in the art, such as belt driven, chain driven, gear driven, direct drive, and the like, and include clamp bars substantially parallel to the shaft axis. A cover 64 encircling the horizontal shaft 60 is radially supported by spokes substantially identical to the spokes 32 of the side brushes 12, and thus will not be described in further detail.

In the embodiment disclosed herein, the top brush cover 64 is formed from a plurality of adjacent cover sections 68 encircling the shaft 60 to form the elongated top brush cover 64. Each top brush cover section 68 is constructed substantially identical to the cover 34 described above. Advantageously, each cover section 68 can be independent of the adjacent cover sections 68 to simplify replacement of a worn or damaged cover section 68. Of course, the cover sections 68 can be fixed relative to each other using methods known in the art, such as sewing, ultrasonic welding, snaps, hooks, hook and loop fasteners, and the like, without departing from the scope of the invention.

In use, the vehicle 16 being washed moves along the vehicle path, and is sprayed with a liquid, such as a soap solution. The shafts 26, 60 of the top and side brushes 14, 12 rotate to centrifugally force the cover 34, 64 of each brush 12, 14 against the vehicle 16 and remove dirt and grime. Advantageously, by providing a brush 12, 14 having a cover 34, 64 that encircles, and is fixed relative to, a rotating shaft 26, 60, the cover 34, 64 does not slap against the vehicle 16 or wrap around vehicle parts.

While there has been shown and described what are at present considered the preferred embodiments of the invention, it will be obvious to those skilled in the art that various changes and modifications can be made therein without departing from the scope of the invention defined by the appended claims. For example, short strips can be fixed to the cover outer surface to more aggressively remove dirt and grime from the vehicle. The strips can be provided with a length that minimizes slap and vehicle damage. In addition, the cover can be fixed directly to the shaft without the use of spokes.

I claim:

1. An automatic vehicle washing apparatus for washing a vehicle received in an area within the vehicle washing apparatus, said apparatus comprising:
    a rotatable shaft adjacent the area within the washing apparatus for receiving the vehicle being washed;
    a cover encircling said shaft, and having a radially inner side and a radially outer side; and
    spokes extending between said shaft and said cover and fixing said cover relative to said shaft, wherein upon rotation of said shaft, centrifugal forces urge said cover radially outwardly away from said shaft into the area within the washing apparatus for receiving the vehicle being washed.

2. The automatic vehicle washing apparatus as in claim 1, in which said cover includes an outer material formed from a fabric selected from a group consisting of a microfiber fabric, cotton, foam, nylon, and polyester.

3. The automatic vehicle washing apparatus as in claim 1, in which said cover is a composite construction including a flexible core material and an outer material, said outer material forming the radially outer side of said cover.

4. The automatic vehicle washing apparatus as in claim 3, in which said core material is selected from a group consisting of a vinyl polyester and a sponge.

5. The automatic vehicle washing apparatus as in claim 3, in which said core material is substantially nonstretching.

6. The automatic vehicle washing apparatus as in claim 3, in which said composite construction includes an inner material forming the radially inner side of said cover, and said inner material is formed from a polyfilter cloth.

7. The automatic vehicle washing apparatus as in claim 1, in which said spokes are formed from a flexible material.

8. The automatic vehicle washing apparatus as in claim 1, in which said cover is cylindrical.

9. The automatic vehicle washing apparatus as in claim 1, in which each of said spokes have a proximal end and a distal end, said proximal end being fixed to said shaft, and said distal end being fixed to said cover.

10. The automatic washing apparatus as in claim 1, in which said rotatable shaft extends vertically adjacent the area within the washing apparatus for receiving the vehicle being washed.

11. The automatic washing apparatus as in claim 1, in which said rotatable shaft extends horizontally over the area within the washing apparatus for receiving the vehicle being washed.

12. The automatic washing apparatus as in claim 1, in which said rotatable shaft is movable relative to the area within the washing apparatus for receiving the vehicle being washed.

13. An automatic vehicle washing apparatus for washing a vehicle received in an area within the vehicle washing apparatus, said apparatus comprising:

a rotatable shaft adjacent the area within the washing apparatus for receiving the vehicle being washed;

a cover encircling said shaft and fixed relative to said shaft, wherein upon rotation of said shaft, centrifugal forces urge said cover radially outwardly away from said shaft into the area within the washing apparatus for receiving the vehicle being washed for engagement with the vehicle being washed.

14. The automatic vehicle washing apparatus as in claim 13 including spokes extending between said shaft and said cover and fixing said cover relative to said shaft.

15. The automatic vehicle washing apparatus as in claim 14, in which said cover includes a radially outer side formed from a fabric selected from a group consisting of a microfiber fabric, cotton, foam, nylon, and polyester.

16. The automatic vehicle washing apparatus as in claim 14, in which said spokes are formed from a flexible material.

17. The automatic vehicle washing apparatus as in claim 14, in which said cover is fixed to distal ends of said spokes.

18. The automatic washing apparatus as in claim 13, in which said rotatable shaft extends vertically adjacent the area within the washing apparatus for receiving the vehicle being washed.

19. The automatic washing apparatus as in claim 13, in which said rotatable shaft extends horizontally over the area within the washing apparatus for receiving the vehicle being washed.

20. The automatic washing apparatus as in claim 13, in which said rotatable shaft is movable relative to the area within the washing apparatus for receiving the vehicle being washed.

* * * * *